United States Patent [19]

Powell et al.

[11] 4,216,053
[45] Aug. 5, 1980

[54] RECOVERY OF AMMONIUM DECAVANADATE FROM AQUEOUS SOLUTION

[75] Inventors: John L. Powell, Hot Springs, Ark.; Peter C. Rekemeyer, Johannesburg, South Africa; Earl E. Falk, Grand Island, N.Y.

[73] Assignee: Union Carbide Corporation, New York, N.Y.

[21] Appl. No.: 949,249

[22] Filed: Oct. 6, 1978

Related U.S. Application Data

[63] Continuation of Ser. No. 724,135, Sep. 17, 1976, abandoned.

[51] Int. Cl.² .............................................. B01D 1/18
[52] U.S. Cl. .................................. 159/48 R; 159/4 A; 423/67
[58] Field of Search ............... 159/48 R, 4 A; 423/62, 423/67, 593

[56] References Cited

U.S. PATENT DOCUMENTS

| | | | |
|---|---|---|---|
| 2,163,773 | 6/1939 | Bowman | 423/593 |
| 3,132,920 | 5/1964 | Goren | 423/593 |
| 4,039,582 | 8/1977 | Nasyrov et al. | 423/593 |

OTHER PUBLICATIONS

Unit Operations of Chemical Engineering, Warren L. McCabe and Julian Smith, McGraw-Hill Book Company, Inc., New York, Toronto, London 1956 pp. 881-885.

Primary Examiner—Norman Yudkoff
Attorney, Agent, or Firm—Fred Ian Nathanson

[57] ABSTRACT

Solid particles of ammonium decavanadate are recovered from an aqueous ammonium decavanadate solution by atomizing the solution and heating the fine droplets to vaporize the water constituent and form solid particles of ammonium decavanadate which are quickly cooled.

2 Claims, 1 Drawing Figure

U.S. Patent
Aug. 5, 1980
4,216,053
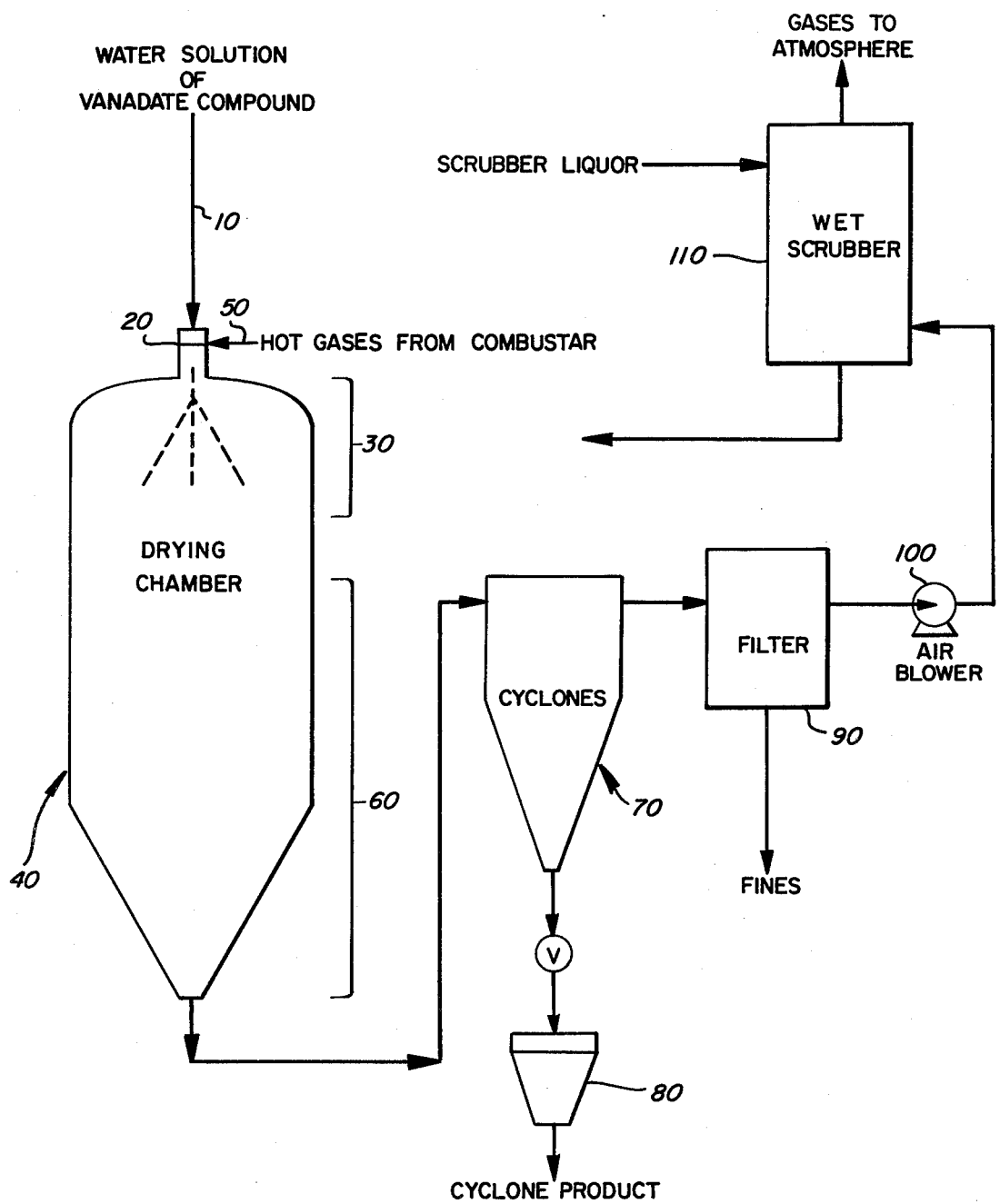

RECOVERY OF AMMONIUM DECAVANADATE FROM AQUEOUS SOLUTION

This application is a continuation of our prior U.S. application Ser. No. 724,135, filed Sept. 17, 1976, now abandoned.

The present invention is directed to the recovery of vanadium values from aqueous vanadate solutions.

It is a common industrial practice to process vanadium ores to obtain aqueous vanadate solutions from which the vanadium values are recovered in the form of an industrially usable solid vanadate product. The conventional prior practice for recovering solid vanadate product involves crystallization techniques which result in a contaminated liquid effluent due to relatively low solids recovery. In the case of ammonium vanadate the effluent is contaminated with ammonia.

It is an object of the present invention to provide a process for recovering vanadium values from aqueous vanadate solutions which provide high recoveries of vanadium and avoids the formation of a contaminated liquid effluent.

Other objects will be apparent from the following description and claims taken in conjunction with the drawing wherein FIG. 1 shows schematically a process arrangement for the practice of the present invention.

A method in accordance with the present invention for recovering a solid vanadate compound from an aqueous solution comprises atomizing an aqueous vanadate solution to provide fine droplets of vanadate solution, introducing the fine droplets of solution into a heated zone which is at a temperature in the range of about 300° to 750° C., preferably 400° to 550° C. to vaporize the aqueous constituent of the droplets and provide fine sized solid vanadate particles, and rapidly cooling the fine sized particles to a temperature below about 250° C., preferably below about 150° C.

The present invention will be more fully understood with reference to the drawing which shows an aqueous solution of vanadate compound introduced to conduit 10. The solution passes through a nozzle 20 and is thereby atomized into a fine spray of fine droplets of vanadate solution.

The fine droplets of solution are subjected to a high temperature in zone 30 of chamber 40, i.e. in the range of 300° to 650° C. This temperature is established by hot gases entering chamber 40 at inlet conduit 50. The solution droplets are rapidly vaporized in zone 30, i.e. the water constituent is vaporized, and very small particles of solid vanadate material is swept into zone 60 by the gases from conduit 50. Zone 60 is at a temperature of less than about 250° C. which can be established by coordinating the design of chamber 40 with the cooling of the gases within chamber 40 due to vaporization of the liquid droplets. Alternatively, the lower portion of chamber 40 can be conventionally water-cooled. By rapidly moving the vanadate particles into cooler zone 60, decomposition of the small vanadate particles which are on the order of 0.5 to 100 microns is avoided.

The thus produced dry, fine vanadate particles in the form of a powder are swept from chamber 40 by the gases from inlet 50 to a conventional cyclone arrangement 70 from which vanadate product is recovered at collector 80. Very fine dust-like particles are recovered at conventional filter unit 90 and the exhaust gas and vapor are conventionally transferred via blower 100 to scrubber 110.

The following example will further illustrate the present invention.

EXAMPLE

A water solution of ammonium decavanadate, $(NH_4)_6 V_{10}O_{28}$, in the amount, in 2 liter amounts, was fed through a centrifugal wheel atomizing nozzle at different rates, into a vertical spray drying chamber of the type shown in the drawing (steel shell 0.064 in. thick, 30 in. cylindrical section 30 in. diameter, 24 in. conical end section). The drying chamber was heated by combustion gases from a natural gas-oxygen mixture which passed through the chamber from top to bottom as shown in the drawing. The gas temperature was measured at the inlet and outlet of the chamber. The vanadium content of the vanadate solution, measured as $V_2O_5$ was 7.91% by weight. The results of various tests are shown in the following table.

TABLE I

| Ammonium Decavanadate Soln. Flow Rate. (ml/min) | Ammonium Decavanadate Soln. Temp. °C. | Heating Gas Flow(CFM) | Chamber Inlet Temp. | Chamber Outlet Temp. | Ammonium Decavanadate Recovery |
|---|---|---|---|---|---|
| 154 | 45 | 1.4 | 368 | 127 | 83% |
| 333 | 47 | 1.6 | 480 | 128 | 91% |
| 400 | 42 | 1.8 | 538 | 128 | 88% |

$NH_3$ was not detected in the gas exiting the chamber.

In the practice of the present invention various conventional atomizer devices which provide a mist-like spray of liquid drops about 2–500 microns can be employed such as described at pp 839–840 of the "Chemical Engineers Handbook," 3rd Edition, McGraw-Hill. Also, vanadate solutions other than ammonium decavanadate can be processed such as:

- Ammonium Metavanadate
- Sodium Decavanadate
- Sodium Metavanadate
- Potassium Decavanadate
- Potassium Metavanadate The recovered vanadate product can be conventionally heat decomposed to yield the industrially useful product $V_2O_5$.

Heating and gas flow arrangements other than that shown in the drawing can be used in the practice of the present invention such as exterior heating and horizontal drying chambers and countercurrent gas flow techniques known to the art.

What is claimed is:

1. Process for recovering solid particles of ammonium decavanadate from a solution consisting essentially of ammonium decavanadate dissolved in water which comprises (i) atomizing said ammonium decavanadate solution to provide fine droplets of said ammonium decavanadate solution (ii) introducing said fine droplets of said solution into a stream of gas which passes into and through a vessel having a heated zone which is at a temperature in the range of about 300° C. to 750° C. to thereby vaporize the water constituent of said droplets and provide fine sized ammonium decavanadate particles of about 0.5 to 100 microns and water vapor which exit said heated zone in said stream of gas (iii) passing said stream of gas and the thus provided fine sized ammonium decavanadate particles and water vapor which exit the heated zone into and through a contiguous cooling zone in said vessel which is at a temperature below about 250° C. to avoid decomposition of said ammonium decavanadate particles (iv) recovering said solid fine sized ammonium decavanadate particles exiting said cooling zone.

2. Process in accordance with claim 1 wherein the temperature in the heated zone is from about 400° to 550° C. and the fine sized ammonium decavanadate particles are cooled to below about 150° C.

* * * * *